3,554,883
METHOD OF PURIFYING AQUEOUS SILVER
NITRATE SOLUTIONS
Gerald R. Green, Rochester, N.Y., assignor to Eastman
Kodak Company, Rochester, N.Y., a corporation of
New Jersey
No Drawing. Filed June 6, 1968, Ser. No. 734,848
Int. Cl. C22d 1/12
U.S. Cl. 204—109                                           9 Claims

ABSTRACT OF THE DISCLOSURE

Aqueous silver nitrate solutions, such as are prepared by dissolving silver bullion in nitric acid or recovered from the electrolytic cell in electrorefining of silver, are treated to remove a major proportion of metal contaminants therefrom, with minimum loss of silver, by successive additions of silver oxide to increase the pH and thereby precipitate the metal contaminants which are removed after each precipitation.

---

This invention relates in general to the art of metal refining and in particular to the refining of silver. More specifically, this invention relates to a method of treating aqueous silver nitrate solutions, such as the solution formed by dissolving silver bullion in nitric acid or the electrolytic cell liquor formed in electrorefining of silver, to remove metal contaminants therefrom.

Aqueous silver nitrate solutions prepared by dissolving silver bullion in nitric acid, such as are utilized, for example, in the photographic art in production of silver halides, contain varying amounts of metal contaminants which are ordinarily present in the solution in their ionized form. Similar silver nitrate solutions are formed as a cell liquor in the well known processes of electrorefining of silver, such as the Moebius or vertical process and the Thum or horizontal process. Whether the aqueous silver nitrate solution is formed by dissolving silver bullion or as an electrolytic cell liquor, it will ordinarily contain minor amounts of a large number of different metals, for example, copper, lead, nickel, gold, iron, tin, zinc, chromium, bismuth, sodium, calcium, magnesium, cadmium, palladium, mercury, manganese, and the like. To utilize silver nitrate solutions prepared from silver bullion in the photographic art a substantial proportion of these metal contaminants must be removed to give a product of high purity. In the silver electrorefining processes bars of impure silver are suspended in anode baskets within a silver nitrate electrolyte solution and the silver is plated out at the cathode which is usually made of carbon or stainless steel. In such processes, the concentration of metal contaminants gradually builds up in the cell liquor and if not controlled the contaminants will eventually plate out at the cathode along with the silver. To prevent this, the cell liquor is removed for purification whenever the contaminant level reaches a predetermined point or else a portion of the cell liquor is continuously removed from the cell, treated, and then recycled to the cell.

Various methods of removing metal contaminants from aqueous silver nitrate solutions are known to the art. For example, in silver electrorefining processes, purification of the cell liquor is frequently accomplished by the technique of "copper cementing" in which metallic copper is added to the cell liquor and as a result of an exchange reaction the copper goes into solution and the silver precipitates out. This method of purification is effective but has several serious disadvantages; for example, the high costs incurred in providing the copper and in smelting the silver precipitate to recover the silver, the hazardous and inconvenient operations involved in charging the copper to the liquor and in handling the precipitate, and the serious pollution problems involved in the disposal of large amounts of waste solution containing copper and lead. Moreover, a further disadvantage is that this method does not serve to remove palladium when this metal is present as a contaminant. Another practical and effective method of purifying aqueous silver nitrate solutions is that described in U.S. Pat. 3,141,731. This method is a two-step procedure in which the metal contaminated aqueous silver nitrate solution is first treated with silver oxide to increase the pH and precipitate certain of the contaminants and then heated to a temperature of about 75° C. to about 95° C. and further treated by addition of iron, usually in the form of iron nitrate, and silver oxide to precipitate the remaining contaminants. Although it represents an important advance in the art and is of great value, this process has certain disadvantages which restrict its usefulness. In particular, heating the solution, as is required in the second stage of the process, is a potentially hazardous procedure, especially when organic contaminants are present in the solution, and the use of iron nitrate adds significantly to the costs of operation. Furthermore, since the presence of copper will inhibit reaction with iron nitrate, the first step of the process must be very carefully controlled to ensure complete removal of all the copper and, in consequence, labor costs are high.

It is toward the objective of providing a process of purifying aqueous silver nitrate solutions which is practical and effective and which avoids the disadvantages of the prior art processes described hereinabove that the present invention is directed.

In accordance with this invention, aqueous silver nitrate solutions containing minor amounts of metal contaminants are purified by a process comprising the steps of: (1) mixing the silver nitrate solution with silver oxide in a proportion sufficient to give a pH in the range from about 5.1 to about 5.8 so as to form a precipitate, (2) removing the precipitate to leave a partially purified solution, (3) mixing the partially purified solution with silver oxide in a proportion sufficient to give a pH in the range from about 5.9 to about 6.3 so as to form a second precipitate, and (4) removing this second precipitate to yield the desired purified solution.

As hereinbefore indicated, the impure silver nitrate solution which is purified by the method of this invention can be a solution resulting from dissolving silver bullion in nitric acid or an electrolytic cell liquor from a silver electrorefining process. Such solutions contain a number of different metal contaminants, as hereinbefore described, and frequently also contain some free nitric acid and have a low pH such as a pH of 1 or 2. The present invention is suitable for use with any such solution, regardless of the particular contaminants present or their concentration, but best results are achieved where the silver concentration in the impure solution to be treated is less than about 60 ounces per gallon of solution, because under such conditions the density of the precipitate formed will differ sufficiently from the density of the liquid that they can be separated without undue difficulty.

It was surprising and unexpected to find that successive precipitation with silver oxide at increasing pH, as utilized in this invention, will effectively provide for removal of the metal contaminants from impure aqueous silver nitrate solutions. This procedure promotes the retention of a maximum amount of silver in the solution while at the same ensuring that a maximum amount of the metal contaminants are precipitated. Of course, some of the metal contaminants will remain in the solution but the amount will be sufficiently small that the solution is rendered useful for the purpose intended, for example, cell liquor purified by the method of this invention can be recycled directly to the electrolytic cell. Similarly, some silver will be precipitated along with the contaminants and will usually have to be recovered by smelting, but the amount will be relatively small so that operating costs will be low. All of the metal contaminants ordinarily encountered, including palladium, are removed by means of this invention. Moreover, the need to heat the solution above room temperature is avoided and the use of iron nitrate as a precipitant is eliminated.

The first step of the method disclosed herein involves mixing silver oxide with the impure silver nitrate solution. This procedure can be carried out in any suitable vessel and is preferably conducted under conditions of thorough agitation. The effect of adding silver oxide is to raise the pH and to bring about the formation of a precipitate comprised of insoluble hydroxides and/or oxides of the metal contaminants. The silver oxide should be added in a proportion sufficient to give a pH in the range from about 5.1 to about 5.8 and more preferably in the range from about 5.3 to about 5.5. The pH established in this step must be within the range indicated for satisfactory results to be obtained since, at room temperature, a pH which is significantly below 5.1 will prevent lead from being precipitated and a pH which is significantly above 5.8 will result in an excessive amount of silver being precipitated. The silver oxide which is utilized to adjust the pH of the silver nitrate solution can be obtained from any suitable source but is most conveniently prepared by adding dilute caustic to the impure aqueous silver nitrate solution, recovering the silver oxide which precipitates out, and discarding the remaining solution. To ensure effective precipitation of the metal contaminants, it is preferred that after all of the silver oxide is added the admixture be permitted to stand for a period of a least about one hour before the second step of the process, i.e. separation of the precipitate from the solution, is carried out.

An effective means of separating a solid from a liquid can be used in removing the precipitate formed in the first step of the process, but it is preferred to effect such separation by centrifuging as the precipitate formed in this step is of such nature that it is particularly amenable to separation by this technique.

The third step of the method disclosed herein involves mixing additional silver oxide with the partially purified solution which remains when the precipitate is removed in step (2). In this instance, the silver oxide is added in a proportion sufficient to give a pH in the range from about 5.9 to about 6.3 and more preferably in the range from about 6.0 to about 6.2. Satisfactory results with the method of this invention require a pH within this range for this step since a pH which is significantly below 5.9 will be ineffective in precipitating the remaining lead and nickel and a pH which is significantly above 6.3 will result in a precipitate which occupies such a large volume as to make subsequent separation of the precipitate from the solution extremely difficult. Thorough stirring is preferably employed during the addition of the silver oxide and, to ensure effective precipitation of the metal contaminants, it is preferred that after all of the silver oxide is added the admixture be permitted to stand for a period of at least about four hours before the fourth step of the process is carried out.

The fourth and final step of the method of this invention involves removing the precipitate formed in step (3) to leave the desired purified solution. This may be accomplished by any effective means of separating a solid from a liquid but it is preferred to effect this step by allowing the precipitate to settle and decanting the solution from the vessel, as the precipitate formed in step (3) is of such nature that it is particularly amenable to separation by this technique.

The method of this invention can be carried out in a batch, semi-continuous, or continuous manner, as desired.

Purification of the solution can be effectively accomplished in a two-stage procedure as described, i.e. using two different pH levels, but if desired, the pH can be raised in a series of small increments with removal of the resulting precipitate after each such step. An important advantage of the method of this invention is that all of the steps can be carried out at room temperature so that the increased costs, inconvenience, and hazards of heating the solutions are avoided; however, the method can be performed with satisfactory results at elevated temperatures, such as temperatures of up to about 90° C., if desired. The steps involving separation of a precipitate from a solution can be carried out by means of a single separation technique or by combining several separation procedures, for example, combinations of centrifuging, filtering, settling, and decanting can be used.

In a preferred embodiment of the present invention, the method additionally comprises the step of combining the precipitate resulting from step (3) in the treatment of a first batch of impure silver nitrate solution with a second batch of impure silver nitrate solution which is to be subjected to purification. In other words, the second precipitate from a first batch of impure solution is mixed with a fresh batch of impure solution and then silver oxide is added to the resulting admixture in sufficient proportion to give a pH in the range from about 5.1 to about 5.8, the resulting precipitate is removed, and so forth. By this means, improved results with respect to removal of metal contaminants, particularly nickel, are achieved, i.e., it facilitates precipitation of the metal contaminants while maximizing the retention of silver in the solution.

The invention is further illustrated by the following examples of its practice. In these examples the silver concentration is expressed in ounces per gallon and in all instances where such definition is utilized, in both the specification and the appended claims, definition in terms of troy weight is intended.

EXAMPLE 1

To 100 milliliters of impure silver nitrate liquor taken from an electrolytic cell utilized in a silver electro-refining process there was added at room temperature sufficient silver oxide to raise the pH to 5.4. The impure liquor, as taken from the cell, had a pH of 1.2 and a silver concentration of 50 ounces per gallon, and contained the following contaminants:

| | Percent |
|---|---|
| Copper | 4.0 |
| Lead | 2.0 |
| Nickel | 0.15 |
| Zinc | 0.068 |
| Iron | 0.009 |
| Palladium | 0.004 |
| Tin | 0.0008 |

The silver oxide was prepared by adding one percent sodium hydroxide solution to a quantity of liquor taken from the cell until a pH of 9.0 was reached, permitting the silver oxide to settle out, and decanting the clear liquor.

In adding the silver oxide to the cell liquor, continuous stirring was provided until the pH had stabilized at 5.4. The precipitate which formed was then separated from the solution by filtration to leave a partially purified liquor. Analysis of the precipitate indicated that it contained 28.3 percent silver. The concentration of contaminants in the partially purified liquor was as follows:

| Copper | <0.0001%. |
|---|---|
| Lead | 0.15%. |
| Nickel | 0.15%. |
| Zinc | 0.015%. |
| Iron | Too low to be detected. |
| Palladium | Do. |
| Tin | Do. |

To the above-described partially purified liquor there was added silver oxide in an amount sufficient to give a pH at equilibrium of 6.0. After allowing the precipitate which formed to settle, the clear liquor was removed by decanting. The concentration of contaminants in this clear liquor was as follows:

| | |
|---|---|
| Copper | <0.0001%. |
| Lead | <0.0001%. |
| Nickel | 0.12%. |
| Zinc | 0.003%. |
| Iron | Too low to be detected. |
| Palladium | Do. |
| Tin | Do. |

EXAMPLE 2

To a 500-gallon cone bottom tank there was charged 400 gallons of impure silver nitrate solution obtained from electrolytic refining of silver. The solution had a pH of 1.6 and a silver concentration of 55 ounces per gallon and contained the following contaminants:

| | Percent |
|---|---|
| Lead | 1.27 |
| Copper | 0.91 |
| Zinc | 0.01 |
| Nickel | 0.16 |
| Chromium | <0.0001 |
| Iron | 0.0035 |
| Palladium | 0.0005 |
| Tin | <0.005 |

To this solution there was added at room temperature sufficient silver oxide to give a pH of 5.7 after one-half hour of mixing. The precipitate which formed was separated from the solution by centrifuging to leave a partially purified liquor which had a silver concentration of 51.6 ounces per gallon and a concentration of contaminants as follows:

| | Percent |
|---|---|
| Lead | 0.72 |
| Copper | 0.08 |
| Zinc | 0.006 |
| Nickel | 0.15 |
| Chromium | <0.0001 |
| Iron | <0.0001 |
| Palladium | <0.0001 |
| Tin | <0.005 |

Silver oxide was added at room temperature to the above-described partially purified liquor in an amount sufficient to give a pH at equilibrium of 6.2. The precipitate which formed was allowed to settle and, after removal of the clear liquor by decanting, was recovered from the tank and added to the next batch of impure liquor to be purified. The clear liquor recovered had a silver concentration of 49.5 ounces per gallon and a concentration of contaminants as follows:

| | Percent |
|---|---|
| Lead | 0.24 |
| Copper | 0.04 |
| Zinc | 0.004 |
| Nickel | 0.13 |
| Chromium | <0.0001 |
| Iron | <0.0001 |
| Palladium | <0.0001 |
| Tin | <0.005 |

As demonstrated by the above examples, the method of this invention is capable of reducing the concentration of metal contaminants in impure aqueous silver nitrate solutions to very low levels.

The invention has been described in detail with particular reference to preferred embodiments thereof, but it will be understood that variations and modifications can be effected within the spirit and scope of the invention as described hereinabove and as defined in the appended claims.

I claim:
1. A method of purifying an aqueous silver nitrate solution containing minor amounts of metal contaminants comprising the steps of:
   (1) mixing said silver nitrate solution with silver oxide in a proportion sufficient to give a pH in the range from about 5.1 to about 5.8 to form thereby a first precipitate,
   (2) removing said first precipitate to leave a partially purified solution,
   (3) mixing said partially purified solution with silver oxide in a proportion sufficient to give a pH in the range from about 5.9 to about 6.3 form thereby a second precipitate, and
   (4) removing said second precipitate to thereby recover a purified solution.

2. The method as decsribed in claim 1 wherein said aqueous silver nitrate solution has a silver concentration of less than about 60 ounces per gallon.

3. The method as described in claim 1 wherein said aqueous silver nitrate solution is formed by dissolving silver bullion in nitric acid.

4. The method as described in claim 1 wherein said aqueous silver nitrate solution is formed as an electrolytic cell liquor in the electrorefining of silver.

5. In a process of electrorefining of silver wherein there is formed an impure electrolytic cell liquor composed primarily of aqueous silver nitrate solution with minor amounts of metal contaminants present therein and having a silver concentration of less than about 60 ounces per gallon, the method of purifying said impure liquor comprising the steps of:
   (1) mixing said impure liquor with silver oxide in a proportion sufficient to give a pH in the range from about 5.1 to about 5.8 to form thereby a first precipitate,
   (2) removing said first precipitate to leave a partially purified liquor,
   (3) mixing said partially purified liquor with silver oxide in a proportion sufficient to give a pH in the range from about 5.9 to about 6.3 to form thereby a second precipitate, and
   (4) removing said second precipitate to thereby recover a purified liquor.

6. The method as described in claim 5 wherein the pH in step (1) is in the range from about 5.3 to about 5.5 and the pH in step (3) is in the range from about 6.0 to about 6.2.

7. The method as described in claim 5 wherein the mixture formed in step (1) is allowed to stand for at least one hour before step (2) is performed.

8. The method as described in claim 5 wherein the mixture formed in step (3) is allowed to stand for at least four hours before step (4) is performed.

9. The method as described in claim 5 further comprising the step of combining the second precipitate resulting from treatment of a first batch of impure cell liquor with a second batch of impure cell liquor which is to be treated in accordance with claim 5.

References Cited

UNITED STATES PATENTS

| | | | |
|---|---|---|---|
| 3,141,731 | 7/1964 | Dietz | 23—102 |
| 2,196,764 | 8/1938 | Folwell | 204—109 |

JOHN H. MACK, Primary Examiner

R. L. ANDREWS, Assistant Examiner

U.S. Cl. X.R.

23—102